United States Patent
Peng et al.

(10) Patent No.: US 10,574,520 B2
(45) Date of Patent: Feb. 25, 2020

(54) DYNAMIC RUNTIME RECONFIGURATION OF SERVERS

(71) Applicant: Verizon Digital Media Services Inc., Dulles, VA (US)

(72) Inventors: Dian Peng, Los Angeles, CA (US); Derek Shiell, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 192 days.

(21) Appl. No.: 15/648,161

(22) Filed: Jul. 12, 2017

(65) Prior Publication Data

US 2019/0020541 A1    Jan. 17, 2019

(51) Int. Cl.
*H04L 12/24* (2006.01)
*G06F 8/65* (2018.01)
*H04L 29/08* (2006.01)

(52) U.S. Cl.
CPC ........... *H04L 41/0813* (2013.01); *G06F 8/65* (2013.01); *H04L 29/0809* (2013.01); *H04L 41/0859* (2013.01); *H04L 41/0889* (2013.01); *H04L 67/02* (2013.01)

(58) Field of Classification Search
CPC ........... H04L 41/0813; H04L 41/0889; H04L 41/0859; H04L 41/5025; H04L 29/0809; H04L 67/02; G06F 8/65
See application file for complete search history.

(56) References Cited

U.S. PATENT DOCUMENTS

| | | | |
|---|---|---|---|
| 7,013,298 B1* | 3/2006 | De La Huerga | G06F 17/22 |
| 9,525,587 B2* | 12/2016 | Aleksandrov | G06F 8/65 |
| 2003/0093511 A1* | 5/2003 | Barde | H04L 67/2828 |
| | | | 709/223 |
| 2003/0163452 A1* | 8/2003 | Chang | G06F 16/955 |
| 2007/0055663 A1* | 3/2007 | Hancheroff | G06F 16/9577 |
| 2012/0317492 A1* | 12/2012 | Sheeder | H04N 21/25891 |
| | | | 715/738 |
| 2014/0130157 A1* | 5/2014 | Sallam | G06F 21/552 |
| | | | 726/23 |
| 2016/0170773 A1* | 6/2016 | Franck | G06F 9/4405 |
| | | | 713/2 |
| 2017/0093700 A1* | 3/2017 | Gilley | H04L 45/44 |

* cited by examiner

*Primary Examiner* — James R Sheleheda
*Assistant Examiner* — Franklin S Andramuno
(74) *Attorney, Agent, or Firm* — Ansari Katiraei LLP; Arman Katiraei; Sadiq Ansari (57) ABSTRACT

A dynamic runtime reconfigurable server its operational logic as it performs tasks for different customers at different times based on different configurations defined by the customers. The embodiments reduce resource overhead associated with reconfiguring and loading the different customer configurations into server memory at runtime. The server selectively loads different customer configurations from storage into server memory as the configurations are accessed in response to received client requests. The server also selectively preloads configurations into memory at periodic server restarts based on configurations accessed during the interval prior to each restart. The restart allows the server to remove old configurations from memory and maintain the most recently accessed ones. Restarting is also performed without interrupting server operation in responding to user requests.

20 Claims, 6 Drawing Sheets

DYNAMIC RUNTIME RECONFIGURATION OF SERVERS

BACKGROUND ART

A server is a network connected machine that performs some set of services or operations on behalf of one or more clients. A configuration loaded into server memory controls the services and operations performed by the server. The configuration specifies the operational logic for the server. The configuration can be used to transform a server into a content caching and distribution server, a billing server, a reporting server, and a firewall as some examples. More specifically, a configuration can set the caching policies, purging policies, access restrictions, quality of service, and other operational parameters for a server operationally defined as a content caching and distribution server.

A multi-tenant platform includes one or more servers that perform services and operations on behalf of different customers. Content delivery networks (CDNs), streaming providers, hosting services, and cloud service providers are examples of different multi-tenant platforms in which different customers rely on the same set of servers for services or content distribution.

In some multi-tenant platforms, the customers define configurations that control the services and operations performed by the servers. In some other multi-tenant platforms, the servers perform the same base set of services and operations (e.g., content delivery), but customer configurations customize various parameters or features of those services and operations. Stated differently, the customer configurations can involve high-level or low-level changes to the server operational logic. With respect to a content caching and distribution server, the configuration high-level changes could include customizing content type or file extensions to cache, and the configuration low-level changes could include changing the underlying caching policy implemented by the content caching and distribution server.

Multi-tenant platforms can grow to support thousands of customers. Each customer can define a different configuration. Each additional customer configuration places addition strain on the platform servers not only because of the runtime switching between the different configurations, but also because of the overhead associated with moving the configurations onto the servers and storing each such configuration in the server memory.

Performance degrades if the configurations are not preloaded in server memory as requests for different customer content or services arrive and implicate the different configurations at runtime. When a configuration implicated by an incoming request is not preloaded into server memory, the server conducts a relatively slow disk or network retrieval operation to retrieve the configuration. The server then loads the configuration into memory and reconfigures based on the configuration before it can respond to the request using the operational logic customized according to the implicated customer configuration.

Alternatively, the server can preload all customer configurations to memory. Even though each configuration consumes a small fraction of the server memory (e.g., kilobytes), the total memory allocated for customer configurations can snowball to gigabytes worth of memory when the platform supports thousands of customers, each with a custom defined configuration. The server reconfigures faster by having the customer configurations preloaded into memory than when having to retrieve them from storage or over a network. However, the lack of available memory may compromise other performance aspects of the server. For instance, the server may have a smaller cache footprint because of the larger proportion of memory allocated to preloading the customer configurations into memory. This can cause a greater number of cache misses which slows the ability of the server to respond to a greater number of requests.

Performance can also suffer in terms of server reload time. The servers periodically restart in order to load configurations that include updates or changes made by customers. In other words, restarting allows the server to remove stale configurations and resume operations with the newest or latest set of configurations. Reloading thousands of configurations into memory with each restart takes too much time, again degrading the server's performance in responding to incoming requests.

Also, many of the preloaded customer configurations are never accessed. Multi-tenant platforms typically perform a consistent distribution of customer content or services across the different servers. As a result, each server is tasked with a mere subset of all customer content or services. Therefore, preloading all customer configurations into memory would be wasteful operation as only a subset of the configurations are implicated on any server.

There is therefore a need for selective and efficient server reconfiguration with intelligent configuration management. More specifically, there is a need to dynamically modify the operational logic of a server at runtime in a multi-tenant platform without a one-to-one impact to memory for each supported configuration and without comprising runtime reconfiguration performance of the server, wherein the runtime reconfiguration performance is compromised from repeatedly retrieving configurations from disk or remote storage and loading the retrieved configurations into memory as the server receives requests directed to different customer content or services.

BRIEF DESCRIPTION OF THE DRAWINGS

A preferred embodiment for distributed and selective configuration of servers in a multi-tenant platform will now be described, by way of example only, with reference to the accompanying drawings in which.

DETAILED DESCRIPTION

Disclosed are systems and methods for dynamic runtime reconfiguration of a server running in a multi-tenant platform based on different configurations defined by customers of the multi-tenant platform. The reconfiguration modifies the operational logic of the server as it performs tasks for different customers at different times. This includes customizing the set of services or operations that the server performs in response to different client requests for different customer content or services based on customer customizations, parameters, or other control logic defined in the different customer configurations. Accordingly, when the server receives a request for services or operations of a particular customer, the server dynamically reconfigures at runtime according to the configuration specified by the particular customer.

Some embodiments optimize the dynamic runtime reconfiguration operations of the server by significantly lowering the resource overhead associated with reconfiguring and loading the different customer configurations into server memory at runtime. The server stores the set of customer configurations to abundant but slow storage, such as magnetic disk or solid-state storage as some examples. The server then performs selective loading of a subset of customer configurations from storage into server memory in response to received client requests implicating the selected subset of configurations during runtime. The server quickly and seamlessly modifies its control logic and operations at runtime by switching between different configurations of the subset of configurations loaded to memory. In this manner, the server preserves the limited but faster memory based on a "first-hit" loading of the subset of customer configurations instead of blindly preloading the entire set of customer configurations into memory regardless of whether the customer configurations are accessed or not.

Figure 1:
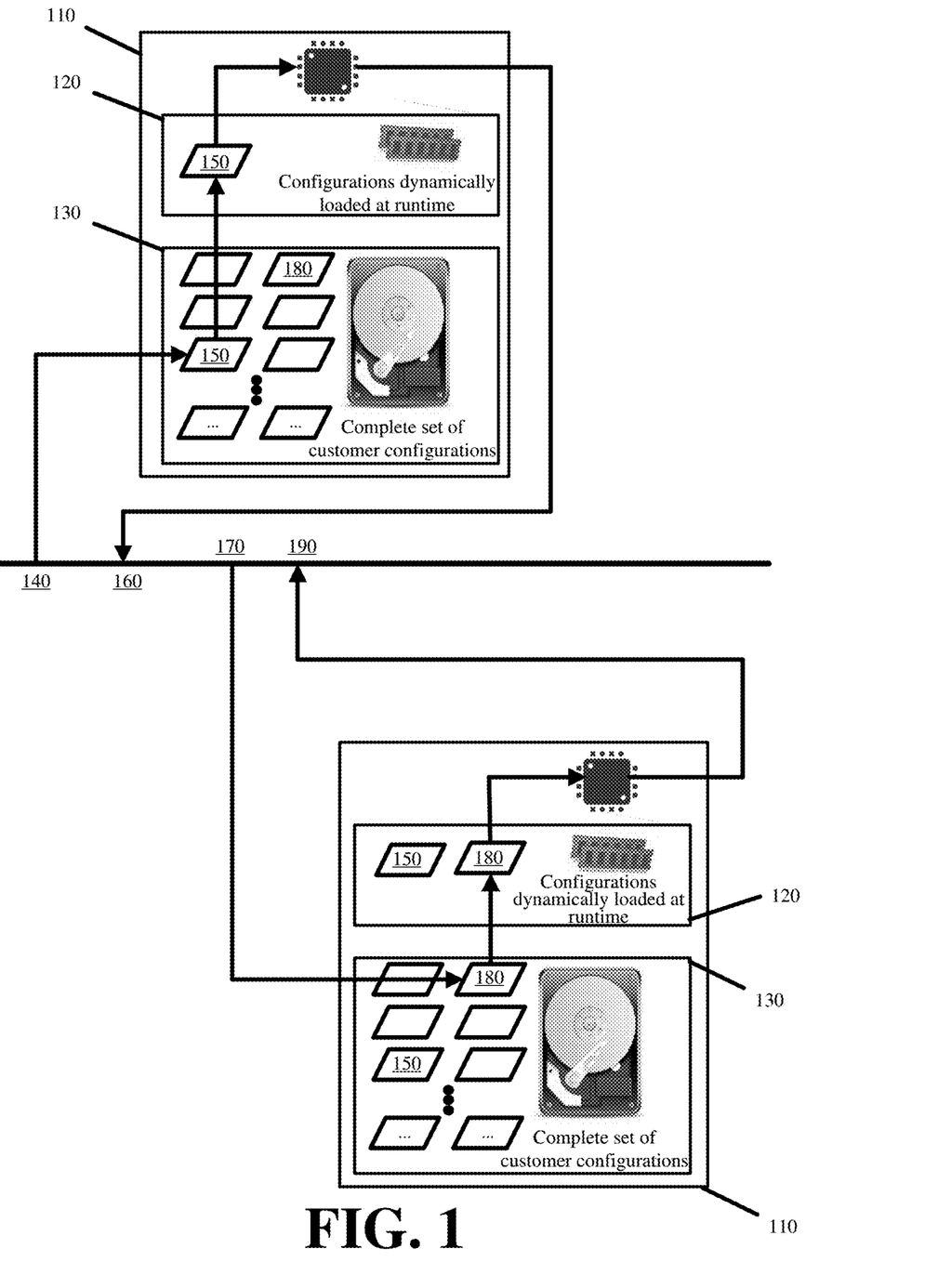
FIG. 1 conceptually illustrates the selective loading of different customer configurations in response to received client requests in accordance with some embodiments.

FIG. 1 conceptually illustrates the selective loading of different customer configurations in response to received client requests in accordance with some embodiments. The figure illustrates a dynamic runtime reconfigurable server 110 of some embodiments at different times during runtime operation. The server 110 has memory 120 and storage 130. The storage 130 stores the full set of configurations defined by customers leveraging the server 110 for some set of services or operations.

In response to receiving a first client request at a first time 140, the server 110 retrieves from storage 130, a first customer configuration 150 defined by a first customer whose content or services are implicated by the first client request. The server 110 loads the first customer configuration 150 into memory 120. Loading the first customer configuration 150 into memory 120 configures a first set of control logic and operations with which the server 110 responds to the first client request at 160. As an example, the first set of control logic and operations can specify rules or scripts with which the server 110 interprets query string arguments, header fields, or cookies submitted with the first client request. The rules or scripts can also configure security or firewall operations of the server 110. The first set of control logic and operations can also control the server's response at 160 by sending different content depending on the first client device or user agent and location, and by further controlling how the server 110 caches the content.

The sever 110 receives a different second client request at 170. In response to receiving the second client request at 170, the server 110 retrieves from storage 130, a different second customer configuration 180 defined by a second customer whose content or services are implicated by the second client request. The server 110 loads the second customer configuration 180 into memory 120. Once in memory 120, the server 110 reads the second customer configuration 180 and reconfigures from performing the first set of control logic and operations specified by the first customer configuration 150 to a different second set of control logic and operations specified by the second customer configuration 180. The server 110 responds to the second client at 190 according to the second set of control logic and operations. The second set of control logic and operations can change the manner in which the server 110 interprets query string arguments, header fields, or cookies submitted with the second client request than when interpreting the query string arguments, header fields, or cookies based on the first set of control logic and operations defined by the first customer configuration 150. Similarly, the second set of control logic and operations can reconfigure the security or firewall operations of the server 110 as well as the manner with which the server 110 sends and caches the content requested by the second client request.

Some embodiments further optimize the dynamic runtime reconfiguration operations of the server by selectively preloading configurations into memory at periodic server restarts based on configurations accessed during the interval prior to each restart. The selective preloading involves tracking the configurations that are implicated by different client requests received over a refresh interval. During the refresh interval, the server substitutes any configurations stored on disk that have been updated by customers with the corresponding updated configurations. The server also receives and stores to disk new customer configurations defined during that refresh interval. The updated configurations can be periodically pulled by or pushed to the server from a configuration repository of the multi-tenant platform. Some embodiments pass an updated configuration whenever the older instance of the configuration is updated. Some other embodiments wait until expiration of an update interval before passing all configurations that have been updated during the update interval. The update interval provides a batch of updated configurations at one time rather than have each server retrieve individual configurations whenever they are updated.

At the end of the refresh interval, the server restarts. As part of the restart, the server preloads into memory, the tracked subset of configurations implicated by different client requests received over the last refresh interval. The configurations previously preloaded into memory at the last server restart but not implicated by a client request during the current interval will not be preloaded at the server restart, and thereby purged from memory. This stops previously loaded or preloaded configurations that have not been recently accessed from continually being preloaded into memory. This preserves server memory and the server's ability to quickly reconfigure its control logic and operations based on the most recently accessed subset of configurations preloaded into memory without the need to retrieve and load those configurations from storage or disk upon receiving a client request implicating any configuration from the most recently accessed subset of configurations.

Figure 2:
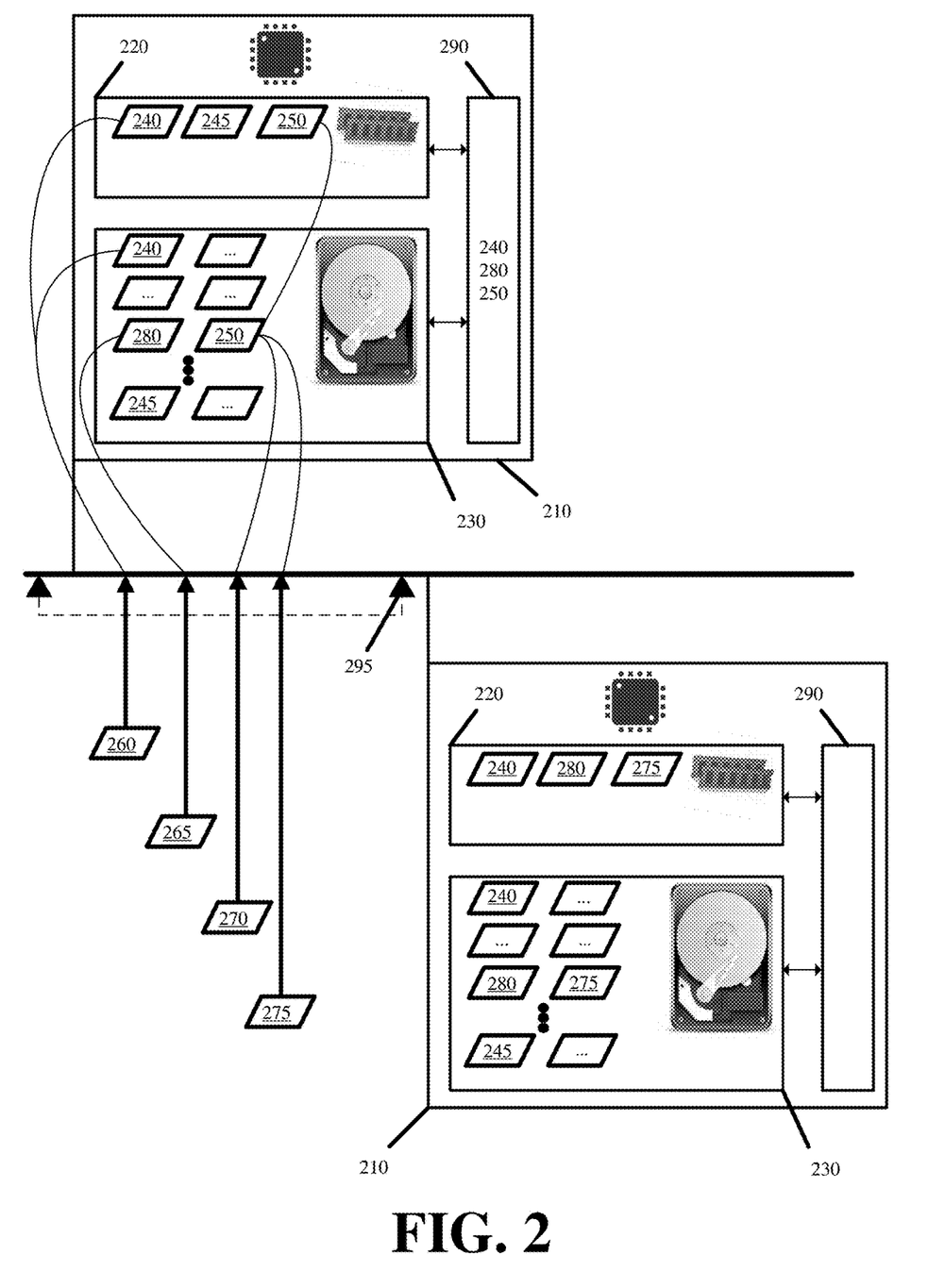
FIG. 2 conceptually illustrates the selective preloading of different customer configurations during periodic server restarts in accordance with some embodiments.

FIG. 2 conceptually illustrates the selective preloading of different customer configurations during periodic server restarts in accordance with some embodiments. The figure initially illustrates the dynamic runtime reconfigurable server 210 of some embodiments with first 240, second 245, and third 250 customer configurations loaded in memory 220. The figure further illustrates the server 210 receiving first 260, second 265, and third 270 client requests and an updated third customer configuration 275 over a current refresh interval. The first client request 260 implicates the first customer configuration 240. The second client request 265 implicates a fourth customer configuration 280 that has not yet been loaded into memory 220. The third client request 270 implicates the third customer configuration 250.

The server 210 is able to reconfigure directly in response to the first 260 and third 270 client requests based on the first 240 and third 250 customer configurations having been preloaded to memory 220. In some embodiments, the server 210 reconfigures its control logic and operations according to the old instance of the third customer configuration 250 already loaded in memory 220 in responding to the third client request 270 rather than the updated third customer configuration 275 received during the current refresh interval. The updated configuration 275 is loaded into memory 220 at expiration of the current refresh interval when the server 210 restarts. Doing so allows the server 210 to continue responding to the client requests in an uninterrupted fashion during the refresh interval while still allowing the server 210 to purge and replace obsolete configurations upon restart at the refresh interval expiration. Some embodiments can set a flag in response to receiving the updated third customer configuration 275. The flag can trigger the retrieval and loading of the updated third customer configuration 275 upon the next client request or expiration of the current refresh interval, whichever occurs first.

The server 210 cannot reconfigure in order to respond to the second client request 265 without first retrieving the fourth customer configuration 280 from storage 230 and then loading the fourth customer configuration 280 to memory 220. This imposes additional delay in the server response time for responding to the second client request 265 relative to the server response time for responding to either the first 260 or third 270 client requests.

The server 210 also updates an internal table 290 tracking the customer configurations implicated during the current refresh interval. In this figure, the server 210 updates the table 290 with entries tracking implication of the first 240, third 250, and fourth 280 customer configurations during the current refresh interval.

The server 210 restarts at expiration of the current refresh interval at 295. The server 210 restarts by inspecting the internal table 290 to identify the customer configurations (i.e., 240, 250, and 280) that were implicated during the current refresh interval. The server 210 then preloads into memory 220 each of the implicated customer configurations (i.e., 240, 250, and 280) from storage 230 while purging or not preloading into memory 220 the previously loaded customer configurations (i.e., the second customer configuration 245) that were not implicated or that became obsolete (i.e., the previous instance of the third configuration 250) as a result of updating during the current refresh interval. The server 210 therefore restarts by preloading into memory 220 the first customer configuration 240, the updated third customer configuration 275, and the fourth customer configuration 280, and by excluding or purging the previously loaded second customer configuration 245 and the old instance of the third customer configuration 250 from memory 220. The server 210 also clears the internal table 290 prior to restarting for the next refresh interval.

In some embodiments, the server loads a master configuration into memory even when no single customer configuration is loaded into memory. The master configuration has global scope and defines the base or default control logic and operations for the multi-tenant platform servers.

The server then selectively loads or preloads customer configurations to supplement, enhance, or otherwise run in conjunction with the master configuration. In some embodiments, the customer configurations override parts of the master configuration global scope by reconfiguring parts of the server base or default control logic and operations with control logic and operations defined by the customer configurations. The control logic and operation reconfiguration is conditional and effectuated in response to client requests that implicate customer configurations defining overriding control logic and operations. The master configuration scope is however retained and used for other control logic or operations not defined by the implicated customer configurations. In other words, any parameters not set by a client request implicated customer configuration are retained from the master configuration scope.

Figure 3:
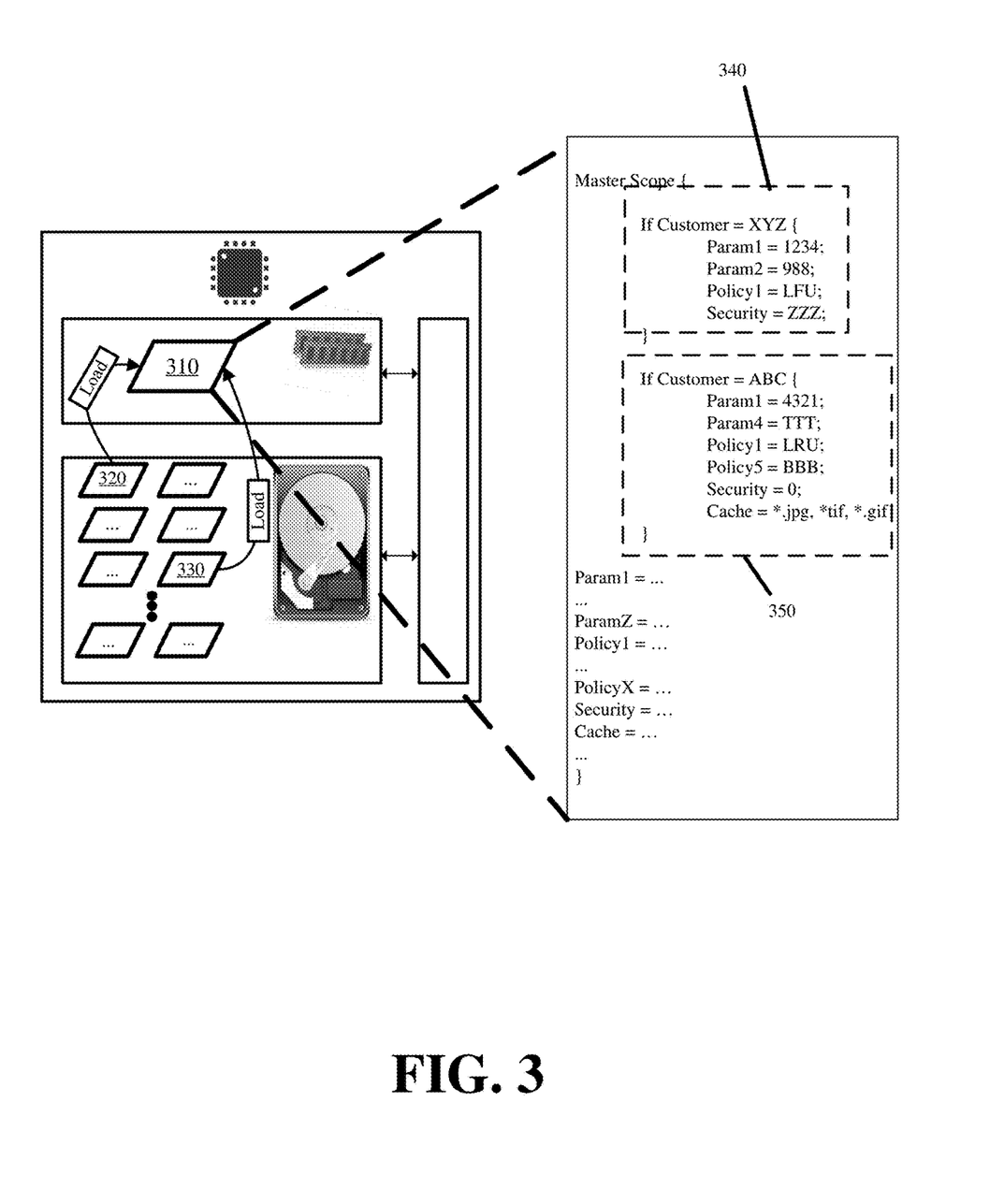
FIG. 3 conceptually illustrates loading the master scope configuration and two different customer configurations in memory in accordance with some embodiments.

FIG. 3 conceptually illustrates loading the master scope configuration 310 and two different customer configurations 320 and 330 in memory in accordance with some embodiments. As the shown the master scope configuration 310 defines default parameters, policies, security, caching, and other settings controlling the server logic and operations. Each customer configuration 320 and 330 overrides one or more of the default settings with customer specific values.

The customer specific values are inserted into the master scope configuration 310 with different customer scopes 340 and 350. Each customer scope 340 and 350 within the master scope configuration 310 is delimited by a customer identifier. In some embodiments, the customer identifier is the hostname or domain name of the customer. This identifier is present in the Uniform Resource Locator (URL) of the client request. Accordingly, the server can identify the implicated customer configuration by extracting the hostname or domain name from the client request URL and by querying the master configuration scope for a matching identifier. The identifier from which an implicated customer configuration can be identified can also include a unique customer value embedded in the request URL. The identifier can also be passed separate from the request URL and as part of an authentication token, a cookie, or the request header. In some embodiments, the identifier for identifying the relevant customer scope is a derived value. The value may be derived from hashing the request URL in some embodiments. The embodiments support requests of all types including HyperText Transfer Protocol (HTTP) requests.

A matching identifier in the master configuration scope indicates that a customer configuration for the customer implicated by the request has been preloaded or loaded into memory. The server reconfigures its control logic and operations based on the configuration parameters identified by the matching identifier. The server will continue to use any logic or operational parameters from the master scope configuration that are not overridden by the identified customer configuration.

When there is no match for the identifier in the master configuration scope, the server retrieves the implicated customer configuration from storage using the identifier. The server loads the retrieved customer configuration into memory. The server can then reconfigure its control logic and operations based on the customer configuration parameters.

If a request implicates a customer that has not defined a customer configuration, the server will be unable to retrieve an implicated customer configuration from storage. In such cases, the server reverts to the master configuration and reconfigures according to the base or default control logic and operations defined by the master configuration.

Figure 4:
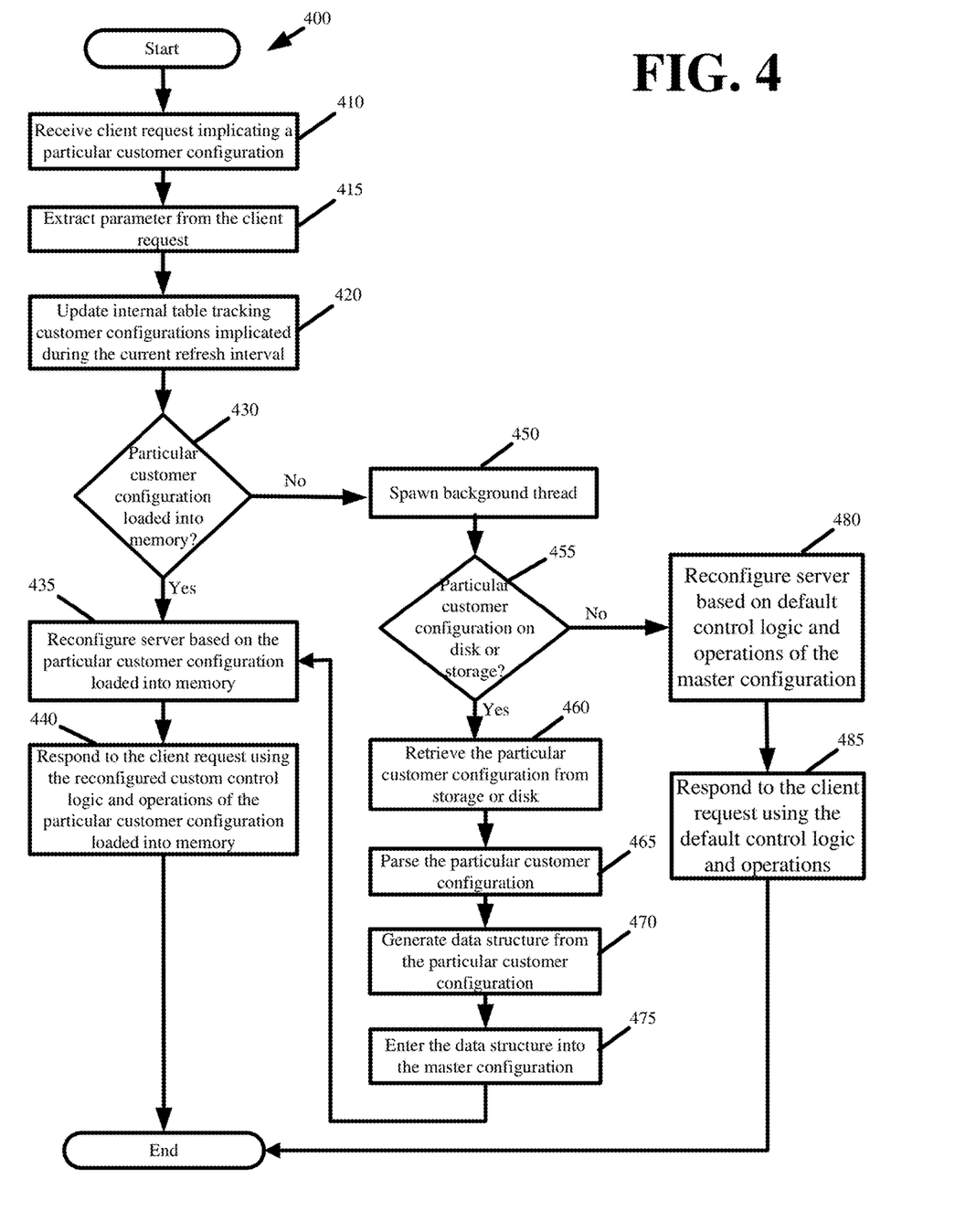
FIG. 4 presents a process by which the dynamic runtime reconfigurable server of some embodiments loads customer configurations into memory at runtime in response to a received client request in accordance with some embodiments.

FIG. 4 presents a process 400 by which the dynamic runtime reconfigurable server of some embodiments loads customer configurations into memory at runtime in response to a received client request in accordance with some embodiments. The process 400 commences with the server receiving (at 410) a client request implicating a particular customer configuration.

The process extracts (at 415) a parameter from which the customer configuration implicated by the client request can be identified. In some embodiments, the extracted parameter is one or more of a host name obtained from the request host header, the request URL, or a socket tag. One or more of the host name, URL, or socket tag can then be used to query different internal tables. The query result provides an internal customer identifier pointing to the customer configuration that is implicated by the corresponding request. In some embodiments, a rewrite rule is used to convert the identifier extracted from the request to one recognized by the server or the distributed platform. For instance, the rewrite rule can convert the client request URL, and more specifically, the URL hostname or domain name to a CNAME that is used to request content or services of a customer served by the server.

The process updates (at 420) the internal table tracking customer configurations that are implicated during the current refresh interval. The updating may involve recording to the internal table, the customer identifier or other link or pointer to the particular customer configuration implicated by the client request.

The process performs (at 430) a query through memory to determine whether the implicated particular customer configuration has already been loaded into memory. The query involves matching the extracted identifier from the client request with the different identifiers delimiting the customer configurations that have already been loaded into server memory.

A successful match made during the query indicates that the particular customer configuration implicated by the client request has already been loaded into memory. Accordingly, the process reconfigures (at 435) the server according the custom control logic and operations loaded into memory from the particular customer configuration. The process responds (at 440) to the client request using the reconfigured custom control logic and operations of the particular customer configuration loaded into memory. In other words, the server's response is customized according to the control logic and operations of the particular customer configuration.

An inability to match the extracted client request identifier to identifiers of customer configurations loaded into memory indicates that the particular customer configuration implicated by the client request has not yet been loaded into memory. In such cases, the process spawns (at 450) a background thread to load the particular customer configuration. Spawning the background thread allows the server to continue running a main thread. Continual running of the main thread allows the server to continue receiving additional client requests and to respond to the additional client request based on control logic and operations of customer configurations that have already been loaded into memory.

Through the background thread, the process queries (at 455) storage or disk to determine if the particular customer configuration has been defined or received. The storage or disk stores all customer configurations whether the customer configurations are used by the server or other servers of the platform. The query to storage or disk is similar to the query to memory and again involves matching an identifier extracted from the client request to identifiers of the different customer configurations stored in storage or disk.

A successful match made during the storage or disk query indicates that the particular customer configuration has been defined but not yet loaded into memory. In response to a match in storage or disk, the process retrieves (at 460) the matching particular customer configuration from storage or disk. The process parses (at 465) the particular customer configuration in order to generate (at 470) a data structure with the parameters and settings defining the server control logic and operations customized by the particular customer configuration. The process loads the particular customer configuration into memory by merging or otherwise entering (at 475) the data structure into the master configuration and by delimiting the data structure with the identifier implicating the particular customer configuration. The background thread can terminate after loading the particular customer configuration into memory such that the process resumes running on the server main thread. In particular, the process resumes on the main thread by reverting to step 435, whereby the server reconfigures (at 435) according the custom control logic and operations loaded into memory from the particular customer configuration and responds (at 440) to the client request using the reconfigured custom control logic and operations of the particular customer configuration loaded into memory.

An unsuccessful match from the storage or disk query indicates that no existing or defined customer configuration is implicated by the client request. In such cases, there is no configuration to load into memory and customize control logic and operations of the server. Accordingly, the process can terminate the background thread for loading customer configurations and resume by reconfiguring (at 480) according to the base or default control logic and operations of the master configuration that is first loaded into memory when the server is initialized or restarts. The process responds (at 485) to the client request using the base or default control logic and operations of the master configuration. In some embodiments, the process responds to a client request implicating an undefined or missing customer configuration with an error message (i.e., 500 HTTP status code).

In some embodiments, the dynamic runtime reconfigurable server maintains a timer or trigger causing the server to restart at expiration of a refresh interval and to preload the customer configurations tracked as being implicated during that refresh interval. However, it should be evident that the server cannot simply shutdown and cease all operations at the interval expiration time. The server buffers client requests that arrive at and during server restart and responds to those requests after restarting and reloading. The server should however continue operating in some capacity in order to complete responding to any requests that arrived before the restart is triggered or the refresh interval expires. Accordingly, some embodiments implement a graceful restart of the server.

The graceful restart involves starting a new instance of a particular server while retaining a prior instance of the particular server at expiration of the refresh interval. The new instance and prior instance can operate over the same set of hardware through a virtualized partitioning of hardware resources. The new instance starts by preloading the customer configurations that were implicated during the now expired refresh interval and tracked to the interval table by the prior instance. The new instance will also begin to accept any new connections for the particular server instead of the prior instance. As a result, all requests that are directed to the particular server after expiration of the refresh interval are received by the new instance.

The prior instance of the particular server is unable to accept any new connections and cannot receive any requests after expiration of the refresh interval. However, the prior instance continues to execute after expiration of the refresh interval until all client requests that were received by the prior instance prior to expiration of the refresh interval have been responded to and the corresponding connections are closed. Thereafter, the prior instance shuts itself down freeing the hardware resources for the new instance or for another instance of the particular server that is started at the expiration of the current interval.

Figure 5:
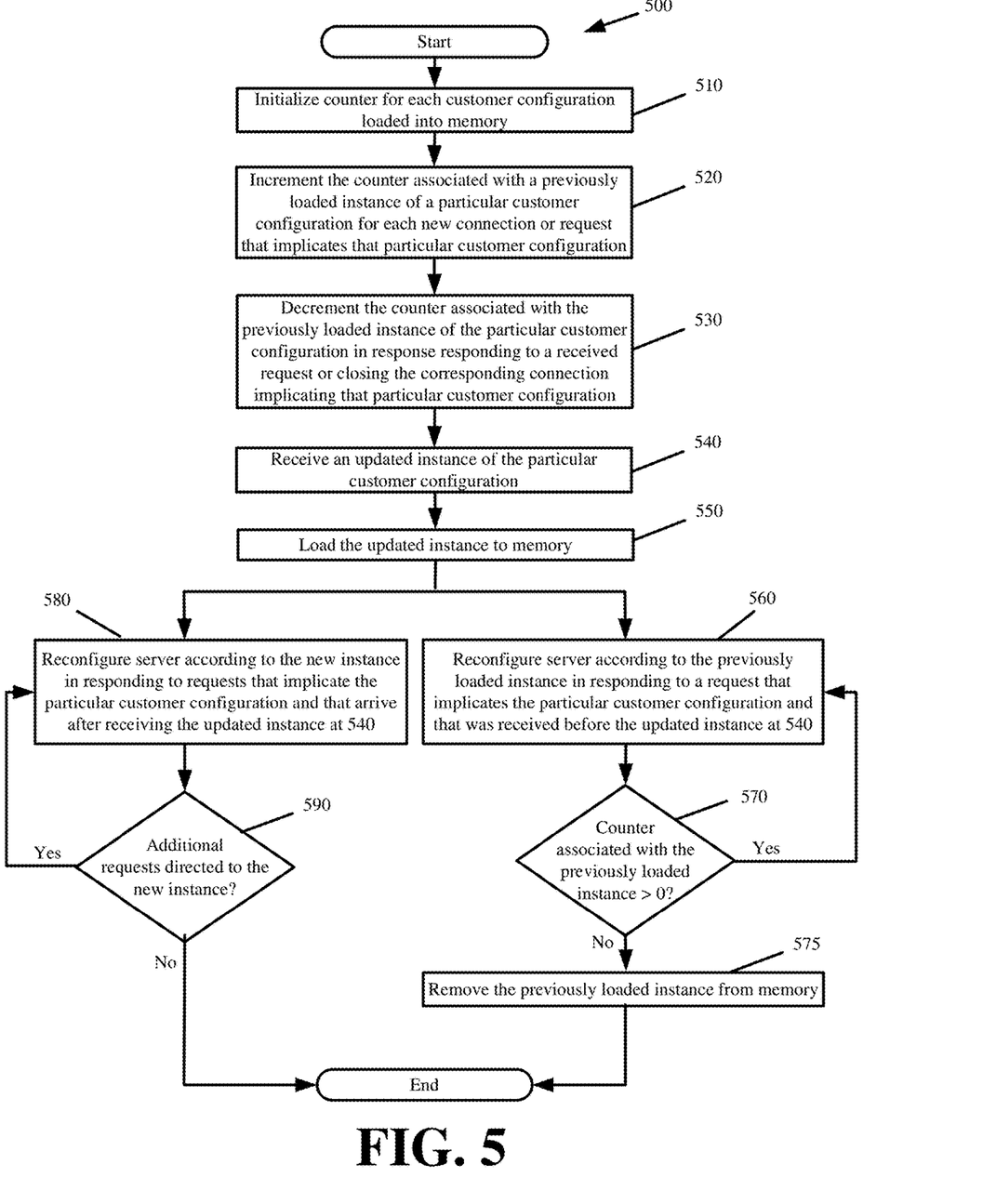
FIG. 5 presents a process for runtime configuration updating in accordance with some embodiments.

In some embodiments, the servers can also update configurations in memory at runtime. FIG. 5 presents a process 500 for runtime configuration updating in accordance with some embodiments.

The process 500 involves initializing (at 510) a counter for each customer configuration loaded into memory. In some embodiments, each counter is implemented as a shared pointer with a reference count.

The process increments (at 520) the counter associated with a previously loaded instance of a particular customer configuration in response to each new connection or request that implicates that particular customer configuration. The process decrements (at 530) the counter associated with the previously loaded instance of the particular customer configuration in response to the server responding to a received request or closing the corresponding connection implicating that particular customer configuration.

The process receives (at 540) an updated instance of the particular customer configuration. The updated instance has one or more parameters that differ from parameters of the previously loaded instance of the particular customer configuration as a result of changes made by the particular customer.

The process loads (at 550) the updated instance to memory and directs any subsequent connections or requests that implicate the particular customer configuration to the updated instance rather than the previously loaded instance of the particular customer configuration. These subsequent connections or requests increment the counter associated with the updated instance. Any new connections or requests that implicate the particular customer configuration and that arrive while loading the updated instance are buffered until loading is complete.

The process then dynamically reconfigures the server operation and logic between the previously loaded instance and the new instance of the particular customer configuration in responding to received requests that implicate the particular customer configuration. In particular, the process reconfigures (at 560) server operation and logic according to the previously loaded instance in responding to a request that implicates the particular customer configuration and that was received before the updated instance at 540. The process decrements the counter associated with the previously loaded instance of the particular customer configuration before checking (at 570) if the counter is zero. The counter for the previously loaded instance of the particular customer configuration reaches zero once all client requests implicating the particular customer configuration that arrived prior to receiving the updated instance have been responded to and the corresponding connections are closed. If the counter is zero, the process removes (at 575) the previously loaded instance from memory. Meanwhile, the process reconfigures (at 580) server operation and logic according to the new instance in responding to requests that implicate the particular customer configuration and that arrive after receiving the updated instance at 540. The process continues (at 590) until there no additional connections or requests implicating the particular customer configuration or there is another update to the configuration that causes the process to restart.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 6:
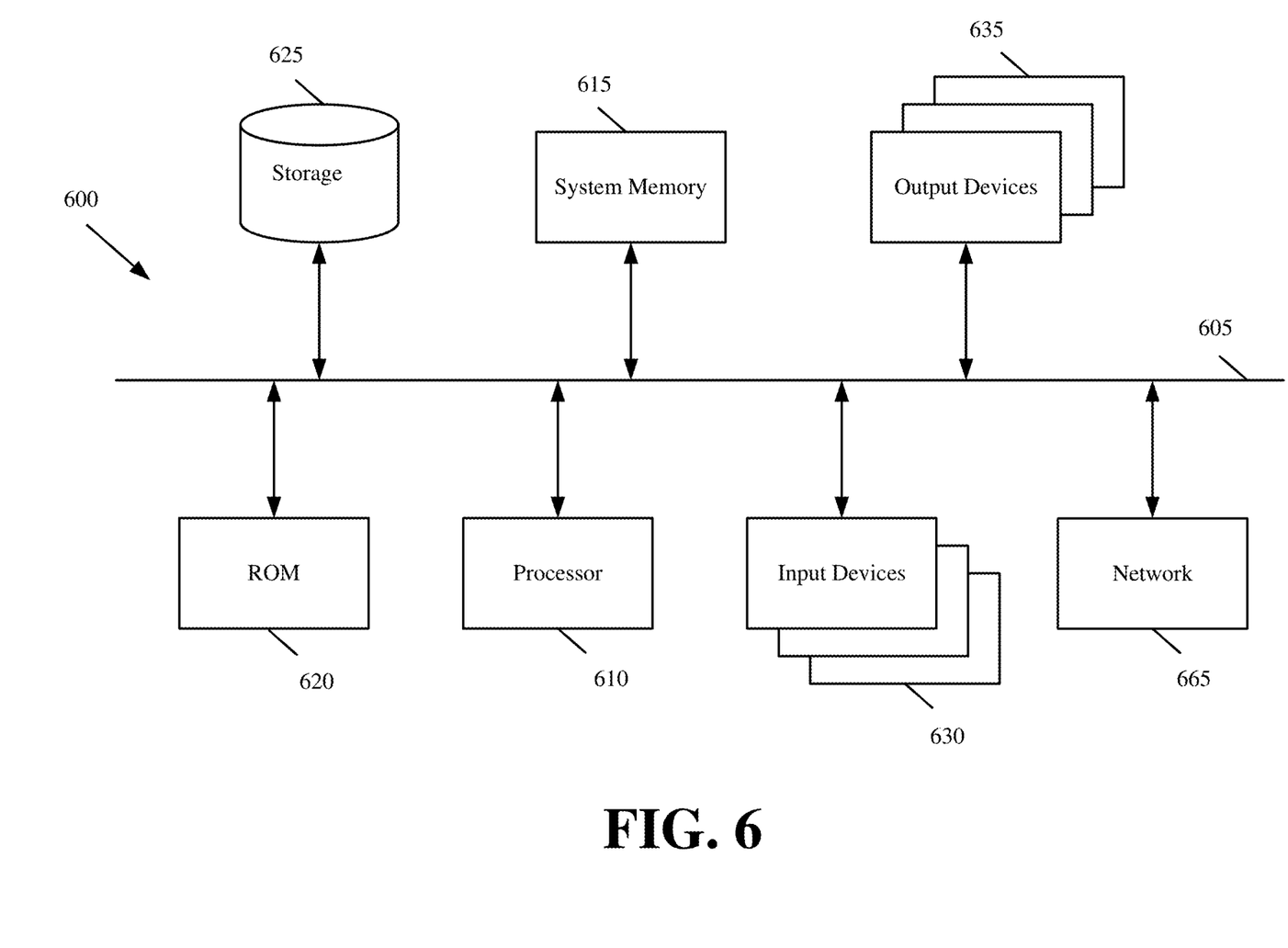
FIG. 6 illustrates a computer system or server with which some embodiments are implemented.

FIG. 6 illustrates a computer system or server with which some embodiments are implemented. Such a computer system includes various types of computer-readable mediums and interfaces for various other types of computer-readable mediums that implement the various methods and machines described above. Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the invention. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 625.

Other embodiments use a removable storage device (such as a flash drive) as the permanent storage device. Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices. The input devices 630 also include audio input devices (e.g., microphones, MIDI musical instruments, etc.). The output devices 635 display images generated by the computer system. The output devices include printers and display devices, such as cathode ray tubes (CRT) or liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 600 may include one or more of a variety of different computer-readable media. Some examples of such computer-readable media include RAM, ROM, read-only compact discs (CD- ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for dynamic server reconfiguration at runtime, the method comprising:
   storing a plurality of different configurations to storage of a particular server, each configuration of the plurality of different configurations reconfiguring operation of the particular server when loaded in memory and implicated by an incoming request to the particular server;
   receiving at the particular server, a first request with a first Uniform Resource Locator (URL) implicating a first configuration of the plurality of configurations;
   detecting that the first configuration is not loaded in the memory based on the first URL not matching to any of a plurality of identifiers entered into a master configuration of the particular server;
   loading the first configuration from said storage into said memory of the particular server in response to said detecting, wherein said loading comprises adding a new identifier based on the first URL into the master configuration, and entering a first set of customized operations from the first configuration into said memory; and
   responding to the first request from the particular server based on the first set of customized operations entered in said memory.

2. The method of claim 1 further comprising receiving at the particular server, a second request after said receiving of the first request, the second request comprising a different second URL implicating a different second configuration of the plurality of configurations.

3. The method of claim 2 further comprising spawning a background thread to run concurrently with a main thread on the particular server, wherein the background thread loads the second configuration from said storage into said memory of the particular server while the main thread simultaneously responds to the first request based on the first set of customized operations entered in said memory.

4. The method of claim 3 further comprising terminating the background thread upon loading the second configuration into said memory, and responding to the second request with the main thread executing a different second set of customized operations entered in said memory from the second configuration.

5. The method of claim 1 further comprising loading the master configuration into said memory in advance of loading any configuration of the plurality of configurations into said memory.

6. The method of claim 5, wherein loading the first configuration into said memory comprises retrieving the first configuration from said storage, generating a data structure from parsing the first configuration, and merging the data structure as part of the master configuration loaded into said memory, wherein the data structure comprises the first set of customized operations.

7. The method of claim 6, wherein said loading further comprises delimiting the data structure with the new identifier, and wherein said responding comprises extracting a particular identifier from the first URL of the first request and matching the particular identifier extracted from the first URL to the new identifier delimiting the data structure of the first configuration in the master configuration loaded into said memory.

8. The method of claim 1 further comprising tracking at the particular server, a subset of the plurality of configurations implicated by different requests the particular server receives over a refresh interval, wherein the plurality of configurations comprises one or more configurations that are not in the subset of configurations, and wherein the one or more configurations are loaded into said memory based on requests received before the refresh interval, and are not implicated by the different requests the particular server receives during the refresh interval.

9. The method of claim 8 further comprising restarting the particular server at expiration of the refresh interval, wherein said restarting comprises preloading the subset of configurations into said memory of the particular server before restarting operations of the particular server over a next refresh interval, and removing the one or more configurations from said memory before restarting operations of the particular server over a next refresh interval.

10. The method of claim 1 further comprising receiving an updated first configuration after said loading the first configuration into said memory.

11. The method of claim 10 further comprising replacing the first configuration in storage with the updated first configuration while simultaneously retaining the first configuration in said memory and completing said responding to the first request based on the first set of customized operations from the first configuration.

12. The method of claim 11 further comprising replacing the first set of customized operations entered in said memory with a different second set of customized operations from the updated first configuration after said responding.

13. A method comprising:
   loading a first set of a plurality of configurations from storage into memory of a particular server before starting a first interval, each configuration of the plurality of configurations reconfiguring operation of the particular server when loaded in said memory and implicated by an incoming request to the particular server;
   tracking a subset of the first set of configurations implicated by different requests received by the particular server during the first interval, wherein the subset of configurations comprises at least one less configuration than the first set of configurations; and
   restarting the particular server at an end of the first interval, wherein said restarting comprises:
      flushing the first set of configurations from said memory at the end of the first interval; and
      preloading into said memory in place of the larger first set of configurations, the subset of configurations, that were implicated by the different requests during the first interval, prior to commencing operation of the particular server at a start of a second interval immediately following the end of the first interval.

14. The method of claim 13 further comprising reconfiguring operation of the particular server for each request of the different requests received during the first interval based on different sets of customized operations loaded in said memory by each configuration of the subset of configurations.

15. The method of claim 13, wherein said restarting further comprises loading a master configuration into said memory of the particular server.

16. The method of claim 15, wherein said restarting further comprises appending different data structures to said master configuration, each data structure of the different data structures comprising a different custom set of operations from a different configuration of the subset of configurations, each custom set of operations reconfiguring operations of the particular server at runtime when implicated by a request.

17. The method of claim 13 further comprising receiving at the particular server after said restarting, a request implicating a particular configuration of the plurality of configurations not preloaded as part of the subset of configurations.

18. The method of claim 17 further comprising retrieving the particular configuration from said storage in response to said receiving of the request implicating the particular configuration.

19. The method of claim 18 further comprising entering a different custom set of operations defined by the particular configuration into said memory.

20. A device comprising:
a storage storing a set of processor-executable instructions and a plurality of configurations;
a memory; and
one or more processors configured to execute the set of processor-executable instructions, wherein executing the set of processor-executable instructions causes the one or more processors to:
load a first set of a plurality of configurations from storage into said memory before starting a first interval, each configuration of the plurality of configurations reconfiguring operation of the device when loaded in said memory and implicated by an incoming request;
track a subset of the first set of configurations implicated by different requests received by the device during the first interval, wherein the subset of configurations comprises at least one less configuration than the first set of configurations; and
restart the device at an end of the first interval, wherein the set of processor-executable instructions to restart comprise processor-executable instructions to:
flush the first set of configurations from said memory at the end of the first interval; and
preload into said memory in place of the larger first set of configurations, the subset of configurations, that were implicated by the different requests during the first interval, prior to commencing operation of the particular server at a start of a second interval immediately following the end of the first interval.

* * * * *